April 26, 1927.
C. B. KOHN
FASTENING DEVICE
Filed Jan. 26, 1927
1,626,138
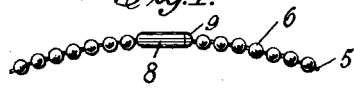
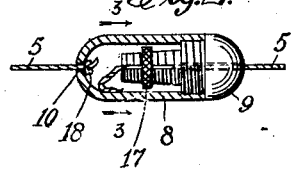 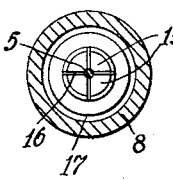 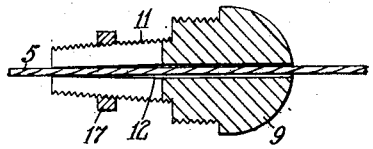
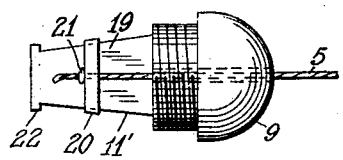 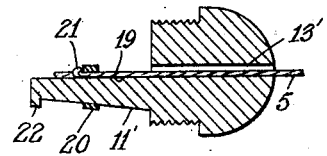
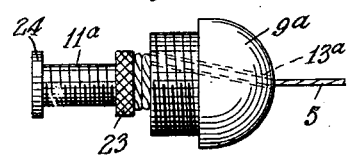 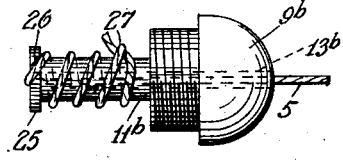
INVENTOR
Chester B. Kohn
BY
Williams & Crose
ATTORNEYS Patented Apr. 26, 1927.

1,626,138

UNITED STATES PATENT OFFICE.

CHESTER B. KOHN, OF SOUTH ORANGE, NEW JERSEY.

FASTENING DEVICE.

Application filed January 26, 1927. Serial No. 163,613.

This invention relates to fastening devices and has particular reference to fastening devices or clasps adapted for use in detachably connecting the ends of the cord or thread of a bead necklace or the like.

The general object of the invention is to provide a simple and inexpensive fastening device of the character mentioned, whereby the terminal portions of a cord or the like may be readily connected together and by means of which adjustments of the length of the cord may be made from time to time in order to retain the beads in close proximity to each other and to the fastening device as the cord, upon which the beads are strung, stretches.

Other objects and advantages of the invention will become apparent from the following description, taken in connection with the accompanying drawings in which Figure 1 is a fragmental elevation of a bead necklace having a clasp embodying the invention associated therewith; Figure 2 is a view of one form of said clasp, the shell portion thereof being shown in central, longitudinal section; Figure 3 is a transverse sectional view taken on the line 3—3 of Figure 2; Figure 4 is a central longitudinal, sectional view of the adjustable, cord-retaining portion of the clasp shown in Figure 2; Figure 5 is a view of another form of adjustable cord-retaining portion of the clasp, adapted for use with the shell portion shown in Figure 2; Figure 6 is a central longitudinal sectional view of the portion of the device shown in Figure 5; and Figures 7 and 8 are views of the other modified forms of the adjustable cord-retaining portion of the clasp, adapted for cooperation with the shell portion shown in Figure 2.

The clasp embodying this invention is adapted to be connected to the opposite ends of a flexible element, herein shown as a necklace cord 5, upon which are strung a plurality of beads 6.

Referring to Figures 1 to 4 inclusive, the particular form of the clasp or fastening device is shown therein as including a pair of anchoring elements 8 and 9. The element 8 is herein shown as a hollow shell, provided at one end with a cord receiving opening 10, and at its other end with internal screw-threads. The element 9, which is the adjustable cord retaining portion of the clasp, is herein shown as a screw-threaded closure, adapted to detachably engage the screw-threaded end of the anchoring element 8. The element 9 has a tapered shank 11 which is provided externally with screw-threads; the element 9 including the shank 11, being provided with a centrally located cord-receiving passage 12. A plurality of prongs 15 are formed in the shank 11, preferably by slotting the outer end of the shank 11, at right angles as shown at 16 in Figure 3; and upon said shank 11, is carried a nut 17, which when run down on the shank towards the large portion thereof, forces the prongs 15 toward the longitudinal axis of the shank 11 and into gripping engagement with the cord 5.

The form of fastening device shown in Figs. 1 to 4 may be attached to the cord by passing one end of the cord through the opening 10 and out of the open end of the shell 8 a sufficient distance to enable the knot 18 to be tied. The opposite end of the cord 5 may then be passed through the passage 12 in the anchoring element 9 and its shank 11, whereupon the nut 17, when run down upon the shank 11, serves to force the prongs 18 into gripping engagement with the cord 5, and thereby anchor the same in place. With the anchoring elements 8 and 9 thus attached, respectively, to the opposite ends of the cord 5, the two anchoring elements 8 and 9 may be attached to each other by screwing the anchoring element 9 into the screw-threaded end of the anchoring element 8, thereby detachably connecting the opposite ends of the cord to each other. If the cord stretches in use it is an easy matter to loosen the nut 17 and take up the slack by pulling the cord through the element 9, after which the nut may be tightened again. Should the fastening device be used in connection with a necklace cord upon which beads are to be strung, such beads are strung after the anchoring element 8 is attached to one end of the cord and before the opposite end of the cord is attached to the anchoring element 9.

In Figures 5 and 6, a slightly modified form of anchoring element 9' is shown. This anchoring element 9' may be substituted for the anchoring element 9, it being adapted for screw-threaded engagement with the screw-threaded end of the hollow shell or barrel 8. The anchoring element 9' is provided with a tapered shank 11' which is cut away or flattened, as shown at 19, thus providing a flat surface, adapted to receive one end of the cord after it has been passed through the passage 13'. The gripping means for anchoring the cord with respect to the element 9 may be in the form of a slidable band 20, carried by the shank 11', which band, when moved down toward the large end of the shank 11', firmly grips the cord and thereby holds the same against displacement. In order to further insure against displacement of the cord, a knot 21 may be tied in the end thereof adjacent the band 20 after such band has been moved into gripping position upon the shank 11'. If desired, the shank 11' may be provided at its end with a lip 22 to prevent accidental removal of the band 20 from the shank 11'.

In Figure 7, another form of anchoring element $9^a$, adapted for use in connection with the anchoring element 8, is shown. This anchoring element $9^a$ is adapted for screw-threaded engagement with the screw-threaded shell or barrel 8, and is provided with a passage $13^a$ which is formed at an angle with respect to the axis of a screw-threaded shank $11^a$, carried by the anchoring element $9^a$. The screw-threaded shank $11^a$ carries a nut 23, and may be provided with a flange 24 to prevent accidental removal of the nut 23. In attaching the anchoring element $9^a$ to the cord, one end of such cord is passed through the opening $13^a$ and then wrapped about the screw-threaded shank $11^a$, whereupon the nut 23 is run down upon the shank $11^a$ into gripping engagement with the cord.

In Figure 8 still another form of anchoring element $9^b$, adapted for use in connection with the screw-threaded shell or barrel 8, is shown. In this form of anchoring element, a plain or smooth surface shank $11^b$ is provided, and the shank $11^b$ and anchoring element $9^b$ are provided with a centrally located longitudinal passage $13^b$, through which one end of the cord may be passed. The shank $11^b$ is provided at its outer end with a flange 25, which is formed with an angular slot 26, adapted to receive the cord when the latter is brought out of the passage $13^b$ and wrapped around the shank $11^b$. The cord is held against displacement by suitably tying the cord to the shank $11^b$, as shown at 27, after sufficient turns have been looped about the shank $11^b$.

The fastening device or clamp, when any one of the several forms of anchoring elements herein shown is employed, not only presents a neat and attractive appearance, but also provides a convenient and reliable means for connecting the opposite ends of a flexible element, such as a cord; provides a simple means by which the slack in the cord, due to stretching thereof, may be taken up so as to retain the beads of a bead necklace, for example, in close proximity to each other without necessitating restringing of the beads, and provides a means by which the necklace may be conveniently lengthened when, for example, it is desired to add one or more beads to the string.

Having thus described certain embodiments of my invention what is claimed is:

1. A necklace clasp comprising a shell portion to which one end of a cord may be attached, and a cord-retaining portion removably connected to said shell portion and having a shank housed within said shell portion and spaced therefrom and adapted to receive and releasably hold a considerable portion of the end of the cord, whereby adjustments in the length of the necklace may be easily made.

2. A necklace clasp comprising a shell portion to which one end of a cord may be attached, and a cord-retaining portion removably connected to said shell portion and having a shank housed within said shell portion and spaced therefrom and adapted to receive and hold a considerable portion of the end of the cord, and movable means carried by said shank for releasably securing the cord to said cord-retaining portion of the clasp.

3. In a cord fastening device, a hollow anchoring element adapted for connection with one end of a cord, a pierced anchoring element adapted for detachable connection with the first named anchoring element and adapted to receive the other end of the cord, and a shank carried by the pierced anchoring element and projecting into the first named anchoring element in a spaced relation to the wall thereof and cooperating with said other end of the cord to hold said other end of the cord anchored with respect to the second named anchoring element.

4. In a cord fastening device, a hollow anchoring element adapted for connection with one end of a cord, a pierced anchoring element adapted for detachable connection with the first named anchoring element and adapted to receive the other end of the cord, a shank carried by a pierced anchoring element and projecting into the first named anchoring element in a spaced relation to the wall thereof, and gripping means associated with said shank to secure said other end of the cord against displacement with respect to the second named anchoring element.

5. In a cord fastening device, a hollow anchoring element adapted for connection with one end of a cord, a pierced anchoring element adapted for detachable connection with the first named anchoring element and adapted to receive the other end of the cord, a shank carried by a pierced anchoring element and projecting into the first named anchoring element in a spaced relation to the walls thereof, and releasable gripping means associated with said shank to detachably secure said other end of the cord against displacement with respect to the second named anchoring device.

6. In a cord fastening device, a hollow anchoring element adapted for connection with one end of a cord, a pierced anchoring element adapted for detachable connection with said hollow anchoring element and adapted to receive the other end of the cord, a screw threaded shank carried by the pierced anchoring element and projecting into the hollow anchoring element in a spaced relation to the wall thereof, and screw threaded gripping means carried by said shank and adapted to cooperate with said other end of the cord to hold said other end of the cord anchored with repect to said pierced anchoring device.

7. In a cord fastening device, a hollow anchoring element adapted for connection with one end of a cord, a pierced anchoring element adapted for detachable connection with said hollow anchoring element and adapted to receive the other end of the cord, a pronged and screw threaded shank carried by the pierced anchoring element and projecting into the hollow anchoring element in a spaced relation to the wall thereof, and screw threaded gripping means carried by said shank and adapted to urge the prongs of said shank into holding engagement with said other end of the cord.

In testimony whereof, I have affixed my signature to this specification.

CHESTER B. KOHN.